(12) United States Patent
Filippini et al.

(10) Patent No.: US 8,830,300 B2
(45) Date of Patent: Sep. 9, 2014

(54) MULTISCALAR STEREO VIDEO FORMAT CONVERSION

(75) Inventors: Gianluca Filippini, Los Gatos, CA (US); Reinhard Steffens, Santa Clara, CA (US); James Dougherty, Morgan Hill, CA (US); Thomas Zato, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 566 days.

(21) Appl. No.: 13/041,363

(22) Filed: Mar. 5, 2011
(Under 37 CFR 1.47)

(65) Prior Publication Data

US 2011/0221864 A1    Sep. 15, 2011

Related U.S. Application Data

(60) Provisional application No. 61/313,012, filed on Mar. 11, 2010.

(51) Int. Cl.
| | |
|---|---|
| *H04N 13/00* | (2006.01) |
| *G06T 15/00* | (2011.01) |
| *G06K 9/00* | (2006.01) |
| *H04N 7/26* | (2006.01) |

(52) U.S. Cl.
CPC ......... *H04N 13/0048* (2013.01); *H04N 13/004* (2013.01); *H04N 13/007* (2013.01); *H04N 19/00472* (2013.01)
USPC .............................. 348/43; 345/419; 382/154

(58) Field of Classification Search
CPC .......... H04N 13/0048; H04N 13/0454; H04N 13/0029; H04N 19/00769
See application file for complete search history.

(56) References Cited

U.S. PATENT DOCUMENTS

| | | |
|---|---|---|
| 5,953,691 A | 9/1999 | Mills |
| 6,154,600 A | 11/2000 | Newman |
| 6,674,479 B2 | 1/2004 | Cook |
| 6,828,987 B2 | 12/2004 | Swan |
| 6,853,385 B1 | 2/2005 | MacInnis |
| 6,868,191 B2 * | 3/2005 | Nister ........................... 382/285 |
| 7,050,113 B2 | 5/2006 | Campisano |

(Continued)

FOREIGN PATENT DOCUMENTS

WO    WO 2007040472 A1 *    4/2007

OTHER PUBLICATIONS

Mizosoe, et al., "An Advanced Multimedia Processing LSI Suitable for HDTV Applications" IEEE International Conference on Consumer Electronics, p. 96-97, Jun. 19, 2001, Publisher: Institute of Electrical and Electronics Engineers, Inc.

(Continued)

*Primary Examiner* — Geepy Pe
*Assistant Examiner* — Rebecca Volentine (57) ABSTRACT

Techniques for converting 3D images using alpha maps are described. A left-view image and a right-view image may be determined from media data received by a 3D display system. An alpha map specifying a plurality of operations for a plurality of locations that correspond to the first plurality of locations in the images may also be determined. The plurality of operations specified in the alpha map may be applied by the 3D display system to process the left-view and right-view images, and to generate, based on the left-view and right-view images, a third image in an appropriate 3D format.

9 Claims, 9 Drawing Sheets

(56) References Cited

U.S. PATENT DOCUMENTS

| | | | |
|---|---|---|---|
| 7,242,411 B2 | 7/2007 | Graves | |
| 7,292,256 B2 | 11/2007 | Lawther | |
| 7,307,667 B1 | 12/2007 | Yeh | |
| 7,414,632 B1 | 8/2008 | Piazza | |
| 8,077,964 B2* | 12/2011 | Berestov et al. | 382/154 |
| 2004/0135780 A1* | 7/2004 | Nims | 345/419 |
| 2006/0164437 A1 | 7/2006 | Kuno | |
| 2006/0164438 A1 | 7/2006 | Kuno | |
| 2008/0303892 A1* | 12/2008 | Kim et al. | 348/42 |
| 2009/0060032 A1 | 3/2009 | Schmit | |
| 2009/0160940 A1* | 6/2009 | Imamura | 348/159 |
| 2009/0249393 A1 | 10/2009 | Shelton | |
| 2009/0295790 A1* | 12/2009 | Pockett | 345/419 |
| 2010/0074594 A1* | 3/2010 | Nakamura et al. | 386/92 |
| 2010/0103168 A1* | 4/2010 | Jung et al. | 345/419 |
| 2010/0103249 A1* | 4/2010 | Lipton et al. | 348/51 |
| 2010/0149210 A1* | 6/2010 | Matsunaga et al. | 345/625 |
| 2010/0171817 A1* | 7/2010 | Tourapis et al. | 348/51 |
| 2010/0225645 A1* | 9/2010 | Suh et al. | 345/419 |
| 2011/0122131 A1* | 5/2011 | Bruls et al. | 345/419 |

OTHER PUBLICATIONS

Berekovic, et al., "Architecture of an Image Rendering Co-Processor for MPEG-4 Systems" Proceedings IEEE International Conference on Application Specific Systems, Architecture, and Processors, Jul. 10-12, 2000.

* cited by examiner

| INPUT | ALPHA MAP | OUTPUT |
|---|---|---|
| SBS | SBS->CB | CB |
| SBS | SBS->OU | OU |
| SBS | SBS->LBL | LBL |
| OU | OU->CB | CB |
| OU | OU->SBS | SBS |
| OU | OU->LBL | LBL |
| LBL | LBL->CB | CB |
| LBL | LBL->OU | OU |
| LBL | LBL->SBS | SBS |
| CB | CB->OU | OU |
| CB | CB->SBS | SBS |
| CB | CB->LBL | LBL |

FIG. 3B determine a first image comprising a first plurality of picture elements for a first plurality of locations in the first image 410 determine a second image comprising a second plurality of picture elements for a second plurality of locations in the second image 420 determine an alpha map specifying a plurality of operations for a plurality of locations that correspond to the first plurality of locations in the first image and the second plurality of locations in the second image 430 apply the plurality of operations specified in the alpha map to generate a third image comprising a third plurality of picture elements for a third plurality of locations in the third image 440

MULTISCALAR STEREO VIDEO FORMAT CONVERSION

CROSS REFERENCE TO RELATED APPLICATIONS

This application claims priority to U.S. Provisional Patent Application No. 61/313,012 filed 11 Mar. 2010, hereby incorporated by reference in its entirety.

TECHNOLOGY

The present invention relates generally to multimedia systems, and in particular, to 3-dimensional (3D) presentation systems.

BACKGROUND

In general, human eyes perceive 3D images based on the slight difference of the right eye view and the left eye view. The illusion of depth can be created by providing an image as taken by a left camera in a stereo camera system to the left eye and a slightly different image as taken by a right camera in the stereo camera system to the right eye.

To support rendering 3D images, a media system typically must be equipped with an extensive array of specially designed functions that process 3D data. For example, the media system must be capable of timely extracting, decompressing and decoding a large volume of 3D image data, processing predictive and statistical information related to image content, constructing 3D image frames, reducing signal noises and crosstalk in the 3D image frames, and rendering/driving the 3D image frames for displaying. Thus, typically, a 3D media system is expensive because of component costs and added complexities in incorporating a large set of specially designed technologies relating to 3D image processing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Example embodiments, which relate to providing multiscalar stereo video format conversion, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline (outline section headings are for reference purposes only and shall not in any way control the scope of the present invention):

1. GENERAL OVERVIEW
 2. MULTISCALAR DISPLAY SYSTEM
 3. MEMORY-BASED VIDEO PROCESSING
 4. EXAMPLE VIDEO PROCESSING
 5. VIDEO DATA LAYERS
 6. EXAMPLE ALPHA MAPS AND VIDEO FORMAT CONVERSIONS
 7. PROCESS FLOW
 8. IMPLEMENTATION MECHANISMS—HARDWARE OVERVIEW
 9. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example embodiment in a condensed and simplified format, and should be understood as merely a conceptual prelude to a more detailed description of example embodiments that follows below.

Techniques are provided for using alpha layers to convert input video images in 3D stereoscopic formats into output video images in an appropriate 3D format for a display unit. Video scaling and mixing may be used to accomplish 3D format conversions. A broad range of 3D format conversions may be supported by simple components including, but not limited to, video scalars, graphics scalars, on-screen-display units, video mixers, etc. In some possible embodiments, these simple components may be implemented collectively on a single System-on-chip (SOC) component. Thus, techniques as described herein may be incorporated into a broad range of display systems with significantly high efficiencies and low costs.

In possible embodiments of the present invention, a multiscalar display system may receive, or decode 3D image data in a coded bitstream into, a plurality of input video images in an input 3D format. Video scaling operations may be performed on one or more such input video images to produce one, two or more scaled video images. Subsequently and/or conjunctively, video mixing operations may be performed on the scaled video images to generate 3D video images in an appropriate output 3D format for a display unit that renders the 3D video images.

In some possible embodiments, video mixing operations as described herein may be specified using alpha maps in one or more video data layers (e.g., alpha layers). The alpha layers comprising these alpha maps serve as one of inputs to a video mixing component. In some possible embodiments, scaled video images, graphics data, and/or on-screen-display data, may be provided in other video data layers as input to the video mixing component. In some possible embodiments, video mixing operations specified in alpha maps are on a per-pixel basis, and may involve such operations as mapping, translation, rotation, blending, etc. In some possible embodiments, some, or all, of these operations may be performed using simple memory mapping operations.

3D formats as described herein may include, but are not limited to, a frame-sequential (FS) video format, a side-by-side (SBS) video format, a line-by-line (LBL) video format, an over-under (OU) video format, and a chessboard (CB; quincunx) video format.

In some possible embodiments, techniques as described herein may be implemented as methods performed by one or more computing devices. In some possible embodiments, mechanisms such as the display system as described herein form a part of a multimedia system, including but not limited to a server, studio system, art director system, image editor, animation system, movie studio system, broadcast system, media recording device, media playing device, television, laptop computer, netbook computer, cellular radiotelephone, electronic book reader, point of sale terminal, desktop computer, computer workstation, computer kiosk, and various other kinds of terminals and display units.

Various modifications to the preferred embodiments and the generic principles and features described herein will be readily apparent to those skilled in the art. Thus, the disclosure is not intended to be limited to the possible embodiments shown, but is to be accorded the widest scope consistent with the principles and features described herein.

2. Multiscalar Display System

Images may be described herein with reference to one or more example media, including still images, video frames, slide shows, etc. The selection of an example medium in this description may be made for simplicity and concise unity and, unless expressly stated to the contrary, should not be construed as limiting a possible embodiment to a particular medium as embodiments of the present invention are well suited to function with any media content.

Figure 1A:
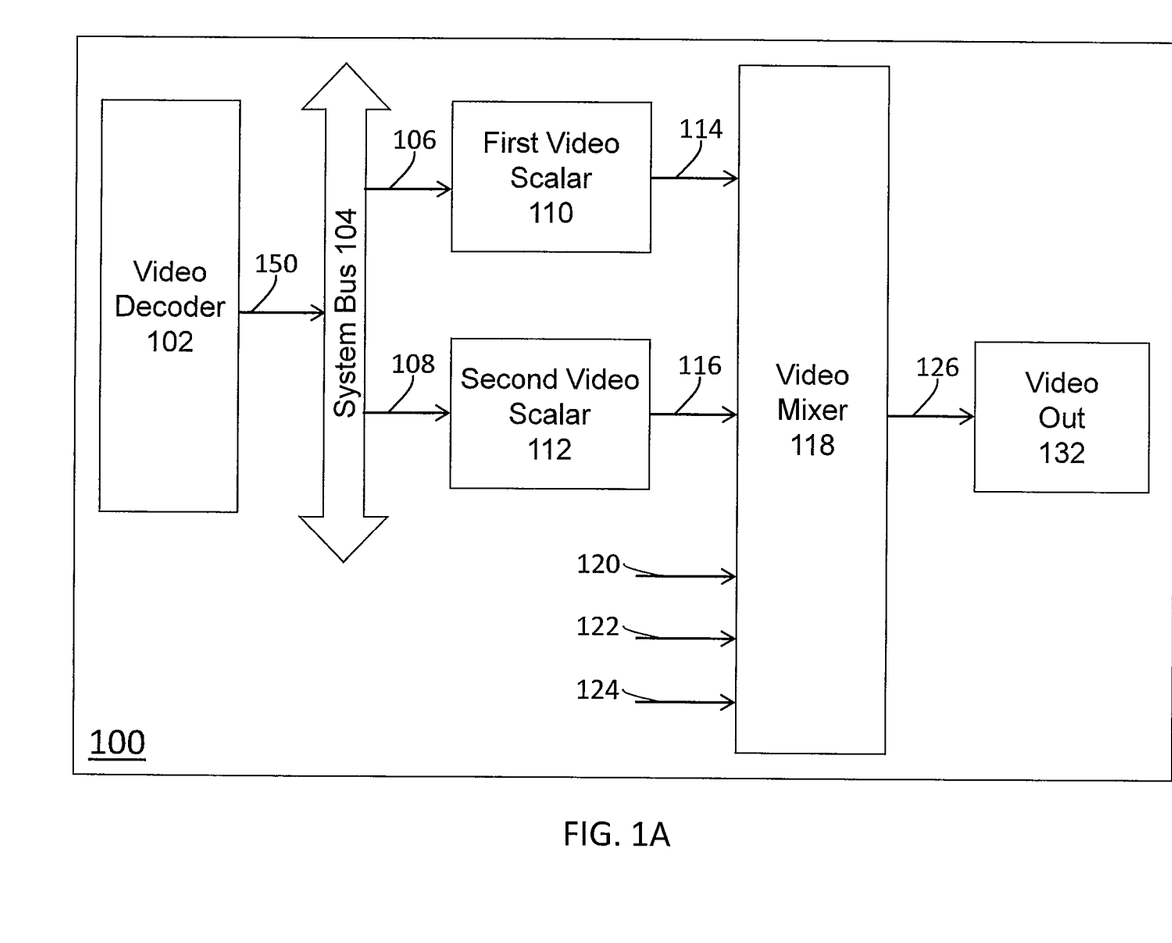
FIG. 1A, FIG. 1B, and FIG. 1C illustrate example system configuration for 3D format conversion using alpha maps according to possible embodiments of the present invention.

FIG. 1A shows an example of a multiscalar display system (100) in accordance with one or more possible embodiments. In a possible embodiment, the multiscalar display system (100) generally represents a single device or multiple devices that are configured to render images on a display unit based on image data provided by one or more video sources. In a possible embodiment, as illustrated in FIG. 1A, the multiscalar display system (100) may comprise a video decoder (102), a system bus (104), one, two or more video scalars (e.g., a first video scalar (110) and a second video scalar (112)), a video mixer (118), and a video output (132).

In some possible embodiments, the multiscalar display system (100) may include components located on the same device (e.g., a server, mainframe, desktop PC, laptop, PDA, television, cable box, satellite box, kiosk, telephone, mobile phone, etc.) or may be located on separate devices communicatively coupled over a network (e.g., Internet, Intranet, Extranet, Local Area Network (LAN), Wide Area Network (WAN), etc.), with wire and/or wireless segments. In a possible embodiment, some, or all, of the multiscalar display system (100) may be implemented as a single IC chip, for example, as a system-on-chip (SOC) integrated circuit. In one or more embodiments, the multiscalar display system (100) may be implemented using a client-server topology. The multiscalar display system (100) itself may be an enterprise application running on one or more servers, and in some possible embodiments could be a peer-to-peer system, or resident upon a single computing system. In addition, the multiscalar display system (100) may be accessible from other machines using one or more interfaces, web portals, or any other tool. In one or more embodiments, the multiscalar display system (100) is accessible over a network connection, such as the Internet, by one or more users. Information and/or services provided by the multiscalar display system (100) may also be stored and accessed over the network connection.

In a possible embodiment, the multiscalar display system (100), through the video output (132) for example, interfaces with a display unit that corresponds to any device with a display panel configured to receive and display images. The display unit may include a cathode ray tube, a liquid crystal display, a plasma display, or any other suitable display.

The image data from video sources may be embedded in a coded bitstream representing a file on a media disc, from a media server, or other suitable providers of media files. The image data may also be a coded bitstream transmitted by a media transponder that receives image data wirelessly or with a wired connection. The coded bitstream may logically be structured as a container that comprises one or more image data channels and one or more metadata channels outside the image data channels. One or more of the image data channels may comprise compressed or uncompressed data that can be decoded by the video decoder (102) into input video images (150).

The input video images (150) may comprise video images encoded in any of one or more input video formats. The input video images (150) generally represent any content (e.g., still image, video frame of a set of video frames, a slide from a slide show, a web page, web content, an interface, a desktop application view, a web based application view, an electronic programming guide, on-screen-display, etc.). The input video formats may or may not be properly viewed in a display mode that the display unit is configured for. For example, the input video images (150) may be in the SBS format (which is an example of the input video formats in which the input video images (150) may be encoded) made up of two side-by-side sub images, where the first sub image and the second sub image are similar but represent images for left and right views. The input video images may also, but are not limited to, be in other input video formats such as FS, LBL, OU, CB, etc.

In a possible embodiment, the display unit may provide display mode information to the multiscalar display system (100). The multiscalar display system may automatically obtain the display mode information from the display unit on demand, by polling at one or more times, by notification, or using any other suitable mechanism. In a possible embodiment, a user may manually input and override some or all of the display mode information from the display unit. The display mode information obtained by the multiscalar display system may generally represent any data associated with the current display mode of the display unit. The display mode information may indicate a display mode for 3D. The display mode information may indicate that the display unit supports video images in one of 3D video formats, e.g., FS, LBL, SBS, OU, CB, etc.

In a possible embodiment, the system bus (104) generally represents any hardware and/or software configured to enabling different parts of the multiscalar display system to send and receive data and control information such as video images, or portions therein, status information, commands, etc.

The multiscalar display system may use one or more video scalars (e.g., video scalars 110, 112, etc.) to process portions (e.g., first video image portions 106 and second video image portions 108) of the input video images (150) retrieved via the system bus (104), and to generate, based on the input video images (150), scaled video images (e.g., first scaled video images 114 and second scaled video images 116).

In a possible embodiment, a video scalar (e.g., the first video scalar (110)) generally represents any hardware and/or software configured to apply to portions of the input video images into scaled video images (e.g., the first scaled video images 114). In an example, the first video scalar (110) may receive first video image portions (106) of the input video images (150) via the system bus (104). As used herein, the term "video image portion" may refers to a portion, or a whole, of one or more input video images; for example, a video image portion may refer to a left half of an input video image in the SBS format, or to an under half of an input video image, or to a whole of an input video image in a pair of stereoscopic images in the field-sequential format. The term "scaled video image" may refer to an intermediate video image generated from a portion or a whole of an input video image by operations such as downscaling, upscaling, linear scaling, non-linear scaling, pixel compositing, alpha blending, etc. In a possible embodiment, the video scalars (e.g., 110 and 112) are configured to provide the scaled video images such as the first scaled video images (114) and the second scaled video images (116) to the video mixer (118) as input.

In a possible embodiment, the video mixer (126) generally represents any hardware and/or software configured for receiving video data in a plurality of video data layers including scaled video images and alpha maps, and processing the same into output video images (126). The video mixer (106) may be configured to receive scaled video images in one or more video data layers in the plurality of video data layers. For example, the first scaled video images (114) may be provided in one such video data layer, while the second scaled video images (116) may be provided in another such video data layer. In a possible embodiment, the video mixer (118) may be configured to receiving one or more alpha maps (120) in one or more video data layers. Additionally and/or optionally, the video mixer (118) may be configured to receiving graphics data (122) and/or on-screen-display data (124) in one, two, or more video data layers. The graphics data (122) may, but is not limited to, comprise data for computer-generated graphics or games, for example. The on-screen-display data (124) may, but is not limited to, comprise data for on screen display, for example, closed-captioned texts. The output video images (126) generated by the video mixer (126) may be provided to the video out (132) as input.

In a possible embodiment, the video out (132) generally represents any hardware and/or software configured for receiving video images and processing the same into an output video signal to a display panel. The output video signal may be digital, analog, or both. Additionally and/or optionally, the video out (132) may be configured for performing digital-to-analog conversions to generate analog video data output appropriate for driving the display panel.

Figure 1B:
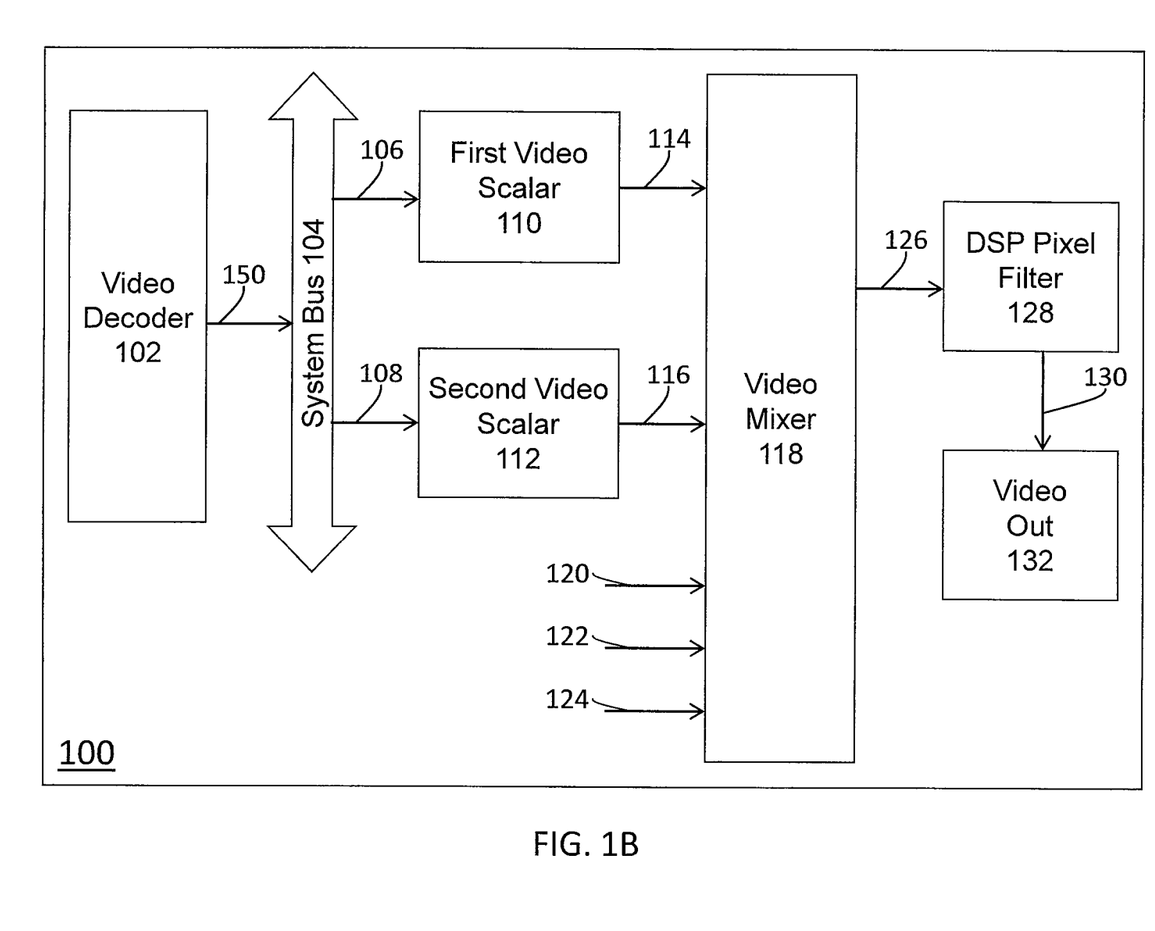

FIG. 1B illustrates an example configuration for an example multiscalar display system (e.g., 100), in accordance with embodiments of the present invention. As shown, the multiscalar display system (100) may comprise a DSP pixel filter (128) between the video mixer (118) and the video out (132).

In a possible embodiment, the DSP pixel filter (128) generally represents any hardware and/or software configured for receiving video images, performing one or more digital pixel filtering on the video images, and providing digitally filtered video images to a video out (e.g., 132). The DSP pixel filter (128) may perform some, or all, of the following functionality: sharpening, de-noising, de-banding, de-blocking, etc.

3. Memory-Based Video Processing

Figure 1C:
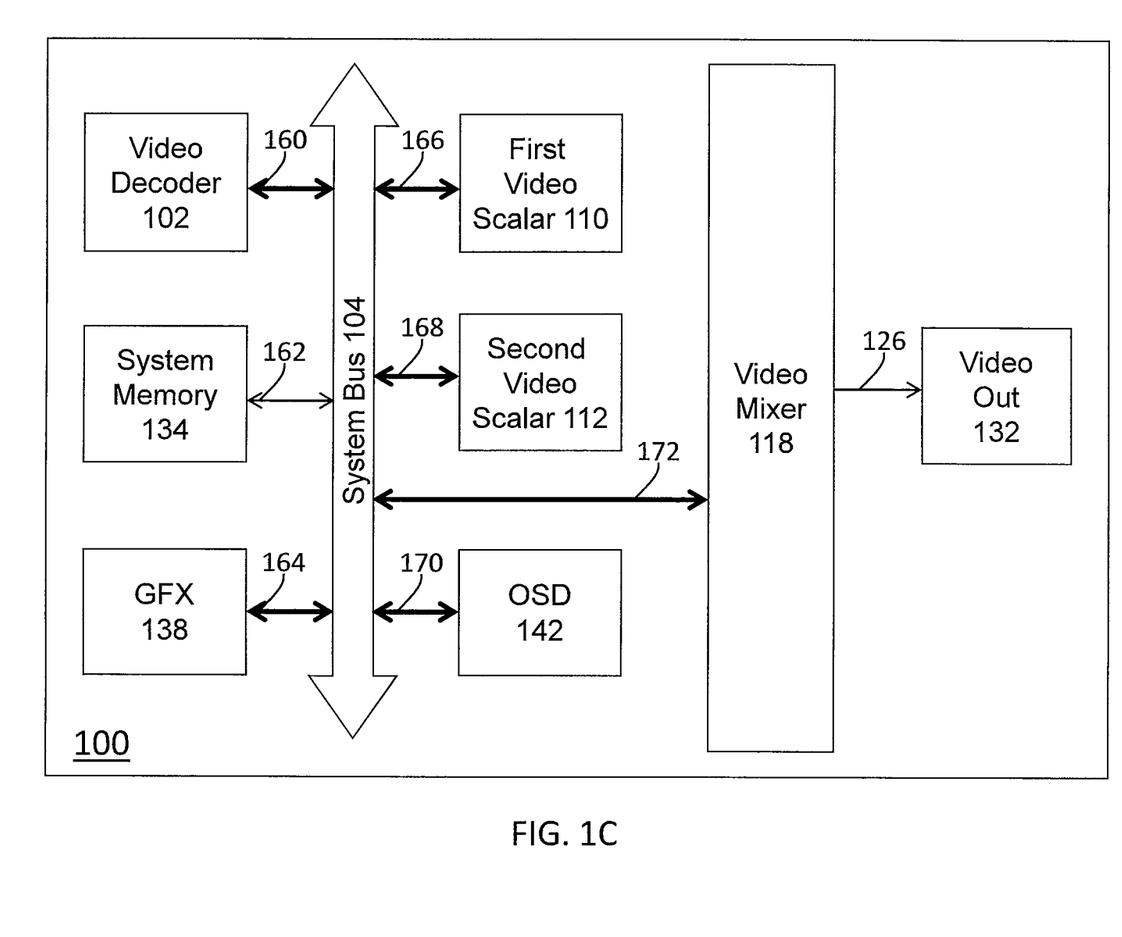

FIG. 1C illustrates an example configuration of an example multiscalar display system (e.g., 100) in which various processing parts interact with system memory (134) to perform their functions, according to a possible embodiment of the present invention. As shown, various processing parts, such as the video decoder (102), video scalars (e.g., the first video scalar (110) and the second video scalar (112)), the system memory (134), the graphics scalar (138), the OSD (142), and the video mixer (118), may receive and/or send data and control information through the system bus (104).

In a possible embodiment, the system memory (134) stores video, graphics, text, alpha maps, and/or other types of data, and provide read/write access to other parts of the multiscalar display system (100) through an memory interface (162) to the system bus (104). In a possible embodiment, the system memory (134) may be divided, either statically or dynamically, to a plurality of memory partitions. Different memory partitions of the system memory (134) may be allocated to storing different types of data in different portions thereof. For example, one or more input video images generated by the video decoder (102) may be stored in one or more first memory partitions of the system memory (134) through a video decoder interface (160). Similarly, graphics data generated by the graphic scalar (138) may be stored in one or more second memory partitions of the system memory (134) through a graphic scalar interface (164). In another example, on-screen-display data generated by the OSD (142) may be stored in one or more second memory partitions of the system memory (134) through an OSD interface (170).

In a possible embodiment, the first video scalar (110) and the second video scalar (112) may perform, or cause the system to perform, operations on the input video images, generated by the video decoder (102), in the system memory (134) through video scalar interfaces (166 and 168). The operations as described herein may or may not require the input video images be actually moved out of and into the system memory (134) physically. For example, the first video scalar (110) and the second video scalar (112) may perform, or cause the system to perform, the operations as memory mapping operations within the system memory (134). These memory mapping operations may be performed in one or more stages in series, in parallel, or partially-in-serial-partially-in-parallel. The results of the memory mapping operations may be scaled video images as previously described and may be stored in one or more memory partitions of the system memory (134).

In a possible embodiment, the video mixer (118) may perform, or cause the system to perform, operations on the input video images, generated by the video decoder (102), the graphics data generated by the GFX (138), and the on-screen-display data generated by the OSD (142), in the system memory (134) through video mixer interfaces (172). In some possible embodiments, these operations may be specified in one or alpha maps that define mapping operations for the generation of the output video images (126). Alpha maps may be stored in the system memory (134), either pre-deposited or generated dynamically. In some possible embodiments, the operations as described herein may or may not require any or all of the above-mentioned data be actually moved out of and into the system memory (134) physically. For example, the video mixer (118) may perform, or cause the system to perform, some, or all, of the operations as memory mapping operations within the system memory (134). The operations performed by the video mixer (118) may be performed in one or more stages in series, in parallel, or partially-in-series-partially-in-parallel. The results of the operations may be the output video images (126).

For the purpose of illustration, the video out (132) directly receives the output video images (126) from the video mixer (118). However, the present invention is not so limited. In some possible embodiments, instead of directly receiving the output video images (126) from the video mixer (118), the video out (132) may be configured to retrieving the output video images (126) from one or more memory partitions in the system memory (134) or from an output of another part of the multiscalar display system (100), for example, the DSP pixel filter (128).

4. Example Video Processing

Figure 2A:
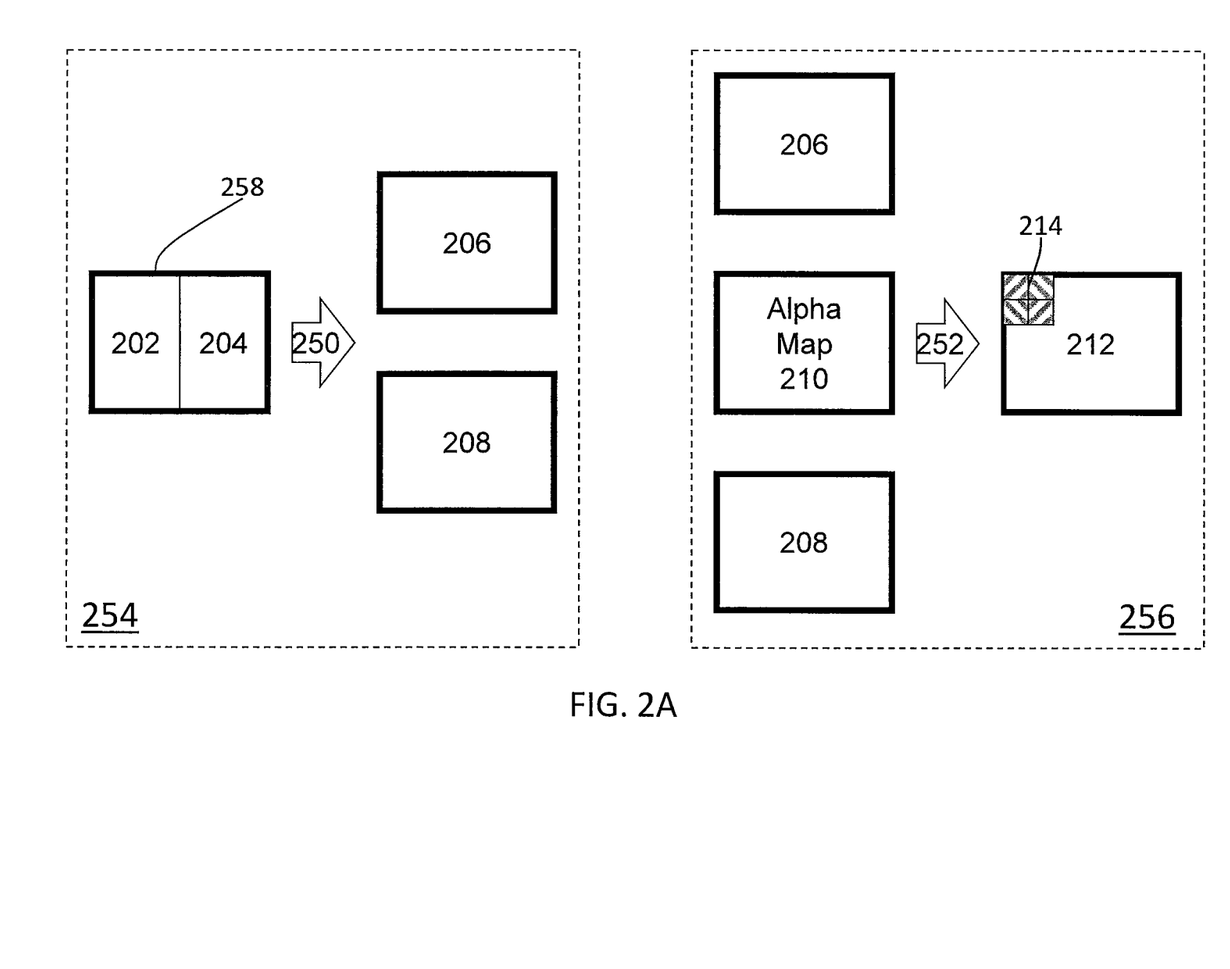
FIG. 2A and FIG. 2B illustrate an example 3D video processing, according to possible embodiments of the present invention.

FIG. 2A depicts an example block diagram illustrating video processing performed by a multiscalar display system (e.g., 100) as described herein, according to embodiments of the present invention. Initially, a video decoder (e.g., 102 of FIG. 1A, FIG. 1B and FIG. 1C) may process a coded bit stream and generate one or more input video images. For example, for the purpose of illustration, an input video image (258) in the SBS format may be generated. This input video image (258) comprises a left-view side (202) and a right-view side (204). In a possible embodiment, the video processing performed by the multiscalar display system (100) may comprise two or more stages, for example, a video scaling stage (254) and a video mixing stage (256), as illustrated in FIG. 2A.

In the video scaling stage (254), one or more video scalars (e.g., 110 and 112) may perform, or cause the system to perform, video scaling operations (250) on input video images to produce one or more scaled video images based on the content in the input video image (258). For example, for the purpose of illustrations, an upsampled left-view image (206) and an upsampled right-view image (208) may be produced by the video scaling operations (250).

In some possible embodiments, input video image (258) and scaled video images may be transferred between different parts of the system (100), for example, via the system bus (104). In some possible embodiments, input video image (258) and scaled video images may be cached within memory buffers of different part of the system (100).

In some possible embodiments, input video images (e.g., 258) and scaled video images such as the upsampled images (e.g., 206 and 208) may be entirely placed and operated on within one or more memory partitions of the system memory (134) during this stage of video processing. In some possible embodiments, the video scaling operations (250) are performed using memory mapping operations supported by the system memory (134) and/or memory processing logic (not depicted). For example, a value stored at a memory location representing a left-view pixel at (x, y) in the left-view side (202) of the input video image (258) may be mapped into a corresponding value stored at a corresponding memory location representing a pixel at (2x, y) in the upsampled left-view image (206). Here, (x, y) and (2x, y) denote sets of coordinate values in two Cartesian coordinate systems with origins, respectively, for example, at the upper-left corner of the input video image (258) and the upsampled left-view image (206).

As can be seen from this discussion, the video scaling operations (250) may include operations using a simple memory mapping operation that multiplies (or scales) an x-coordinate of a left-view pixel in the left-view side (202) of the input video image (258) by a factor of an integer 2 to an x-coordinate of a pixel in the upsampled left-view image (206).

The video scaling operations (250) may comprise different operations as illustrated. For example, one half of the pixels in the upsampled left-view image (206) may be populated by the 2× memory mapping operations described above. The other yet-to-be-populated half of the pixels in the upsampled left-view image (206) may be populated by an operation which uses their neighboring pixels' values. In some possible embodiments, the other half of the pixels may be populated by the averages of their nearest neighboring pixels' values. For example, a yet-to-be-populated pixel may be populated by an arithmetic operation with the average value of their two nearest neighbors in their x direction (the direction of scaling).

In some possible embodiments, some, or all of, the video scaling operations (250) may be performed in series, in parallel, or part-in-series-part-in-parallel. For example, all the 2× scaling operations may be performed in parallel for half of the pixels in the upsampled video images (206 and 208), which may be followed by filling operations performed in parallel for all the remaining yet-to-be-populated pixels in the upsampled video images (206 and 208).

In the video mixing stage (256), a video mixer (e.g., 118) may perform, or cause the system to perform, video mixing operations (252) that produce one or more output video images based on the content in one or more scaled video images. For example, an output video image (212) in the CB format may be produced by the video mixing operations (252).

In some possible embodiments, output video images may be transferred between different parts of the system (100), for example, via the system bus (104). In some possible embodiments, output video images may be cached within memory buffers of different part of the system (100).

In some possible embodiments, scaled video image such as the upsampled images (206 and 208) and output video images such as the output CB image (212) may be entirely placed and operated on within one or more memory partitions of the system memory (134) during this stage of video processing. In some possible embodiments, the video mixing operations (250) are specified in an alpha map (210). In some possible embodiments, the alpha map (210) may specify performing one or more per-pixel operations—as a part of the video mixing operations (252)—that populate a value for each pixel of the output CB image (212). For example, for each pixel in a 2×2 pixel square (214) in the output CB image (212), the alpha map (210) may specify performing a set of memory mapping operations that generates a value stored at a memory location representing such a pixel in the output CB image (212). In an example, two pixels on the left-to-right diagonal of the 2×2 pixel square (214) in the output CB image (212) may take values from memory locations representing two corresponding pixels with same x-y coordinates in the upsampled left-view image (206), while the remaining two pixels on the right-to-left diagonal of the same 2×2 pixel square (214) in the output CB image (212) may take values from memory locations representing two corresponding pixels with same x-y coordinates in the upsampled right-view image (208).

In some possible embodiments, some, or all of, the video mixing operations (252) may be performed in series, in parallel, or part-in-series-part-in-parallel.

5. Video Data Layers

Figure 2B:
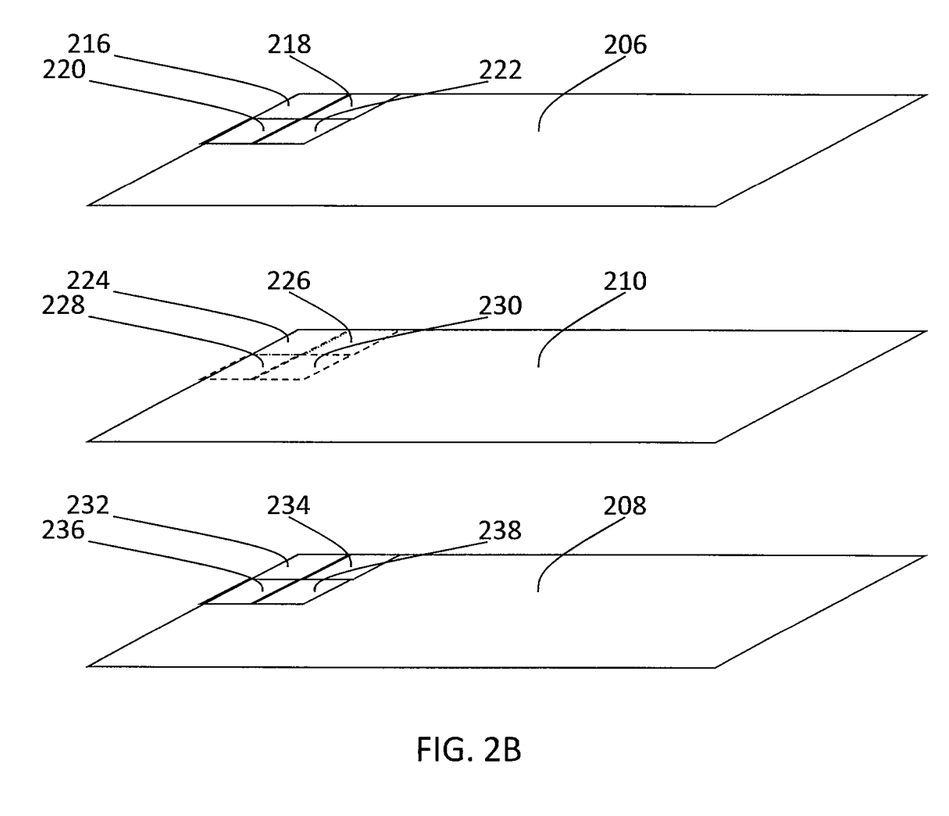

In some possible embodiments, video mixing operations (e.g., 252) as described herein may involve different video data layers, as illustrated in FIG. 2B. For example, scaled video images of a first type (e.g., left-view images such as the upsampled left-view image (206)) may be in a first set of scaled video images produced by a first video scalar (e.g., 110), while scaled video images of a second type (e.g., right-view images such as the upsampled right-view image (208)) may be in a second set of scaled video images produced by a second video scalar (e.g., 112). The first set of scaled video images may be provided to a video mixer (e.g., 118) in the top video data layer as illustrated in FIG. 2B. The second set of scaled video images may be provided to the video mixer (118) in the bottom video data layer as illustrated in FIG. 2B. One or more alpha maps (e.g., 210) may be located in different video data layers such as the middle layer as illustrated in FIG. 2B. In some possible embodiments, the video data layers for the scaled video images may carry dynamic video data as input video images are continually produced from a coded bitstream, while the video data layers for the alpha maps may carry pre-set, static, and/or dynamic video data comprising values that specify per-pixel video mixing operations.

In an example, the upsampled left-view image (206) may comprise four pixels (216, 218, 220 and 222) in a pixel square with four sets of coordinate values. The upsampled right-view image (208) may comprise four pixels (232, 234, 236 and 238) in a pixel square with the same four sets of coordinate values. Each pixel may be used to store a data value of any bit length. Similarly, the alpha map (210) may comprise four corresponding map locations (224, 226, 228 and 230), for example, with the same coordinates as those of the pixels in the two images. Each map location on the alpha map (210) may be used to store a data value of any bit length. The data value stored at a map location may be a 1-bit value, an 8-bit value, etc. In an example, the map location (224) may store a bit value of 1, or −1, or some other value that may be used to specify one or more per-pixel video mixing operations. A per-pixel video mixing operations specified by the map location (224) may cause the system to use the value of a pixel in an image (e.g., 206) in the top video data layer to be used to populate a pixel in an output image (e.g., the output CB image (212)) in the same coordinate position as that of the map location (224). In another example, the map location (226) may store a bit value of 0, or some other value that specifies one or more different per-pixel video mixing operation. A per-pixel video mixing operation specified by the map location (226) may cause the system to use the value of a pixel in an image (e.g., 208) in the bottom video data layer to be used to populate a pixel in an output image (e.g., the output CB image (212)) in the same coordinate position as that of the map location (226). The same may hold true for other memory locations (e.g., 228 and 230).

For the purpose of illustration, video data layers comprising scaled video images and alpha maps have been described. However, the present invention is no so limited. Additional and/or alternative video data layers may be used for mixing or blending into output video images. For example, one or more video data layers that provide graphics data to a video mixer may also be additionally and/or alternatively used. One or more video data layers that provide on-screen-display data to the video mixer may also be additionally and/or alternatively used. Thus, a video mixer as described herein may process these and other types of video data layers in possible embodiments of the present invention.

For the purpose of illustration, alpha maps have been described to provide per-pixel operations that select values from scaled video images to be stored into output images at same coordinate positions. However, the present invention is no so limited. Additional and/or alternative per-pixel operations may be used for mixing or blending pixel values, alpha channel data, etc., from various video data layers into output video images. For example, a per-pixel operation may be specified on an alpha map as involving setting the value of a pixel in an output video images with one or more values of one or more pixels in one or more scaled video images either in the same coordinate positions as, or different coordinate positions than, that of the pixel in the output video images. For example, per-pixel operations may translate, rotate, or mix pixels from different coordinate positions in the scaled video images to pixels in the output video images. In some possible embodiments, per-pixel operations may belong to a set of operations that can be represented by a set of opcodes. A map location on an alpha map as described herein may store an opcode that specifies a corresponding operation in the set of operations. Such an opcode may cause the system to perform the corresponding operation in the process of generating the output video images.

6. Example Alpha Maps and Video Format Conversions

Figure 3A:
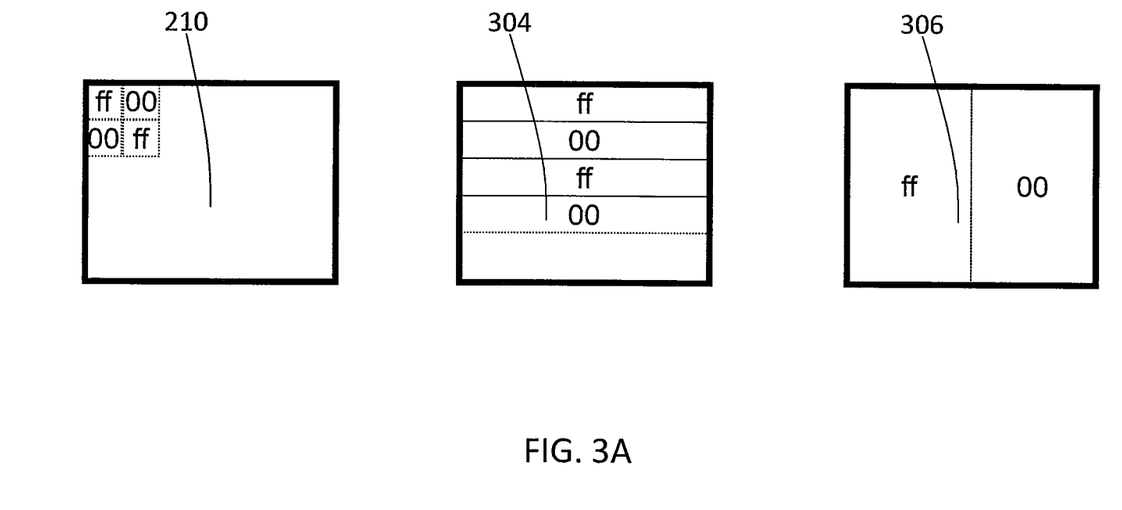
FIG. 3A and FIG. 3B illustrates example alpha maps and video format conversions, according to possible embodiments of the present invention.

FIG. 3A illustrates example alpha maps that may be used to specify per-pixel operations in the video mixing stage, according to a possible embodiment of the present invention. The alpha map (210) may be used to generate output video images in the CB format. A hex value of "ff" (or −1) may be used to represent a selection operation from one of two scaled video images, while a hex value of "00" may be used to represent a selection operation from the other of the two scaled video images.

An alpha map (304) may be used to generate output video images in the LBL format. The hex values in the alpha map (304) may have the same meaning as those in the alpha map (210). That is, a hex value of "ff" may be used to represent a selection operation from one of two scaled video images, while a hex value of "00" may be used to represent a selection operation from the other of the two scaled video images. In some embodiments, a pixel "selection" operation as described herein in video mixing operations may be implemented using alpha blending that completely blocks out a pixel from a video image while being completely transparent to a different pixel from a different video image.

An alpha map (306) may be used to generate output video images in the SBS format. The hex values in the alpha map (306) may have the same meaning as those in the alpha maps 210 and 304. That is, a hex value of "ff" may be used to represent a selection operation from one of two scaled video images, while a hex value of "00" may be used to represent a selection operation from the other of the two scaled video images.

Figure 3B:
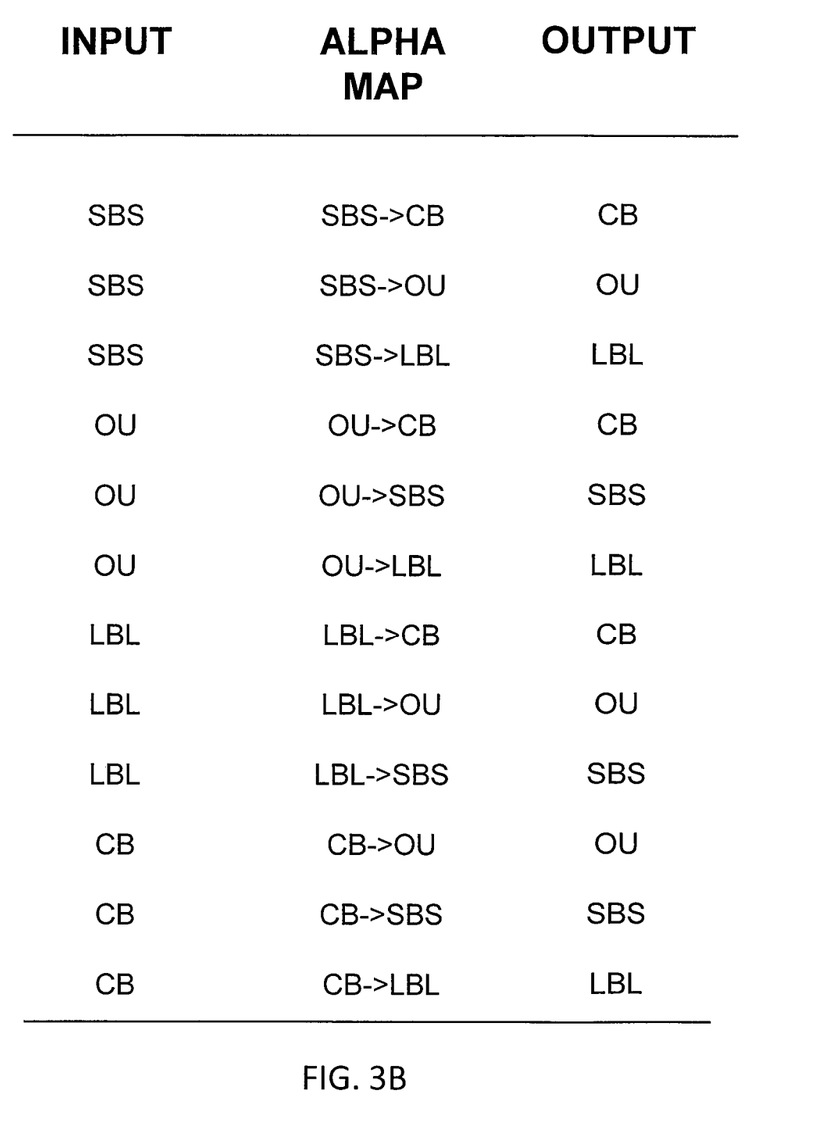

Some, but not all, of 3D image conversions, which may be performed by a multiscalar display system as described herein, are illustrated in FIG. 3B. As illustrated, input video images, which may be in one of FS, SBS, OU, LBL, CB, or another format, may be converted into a different format.

7. Process Flow

Figure 4:
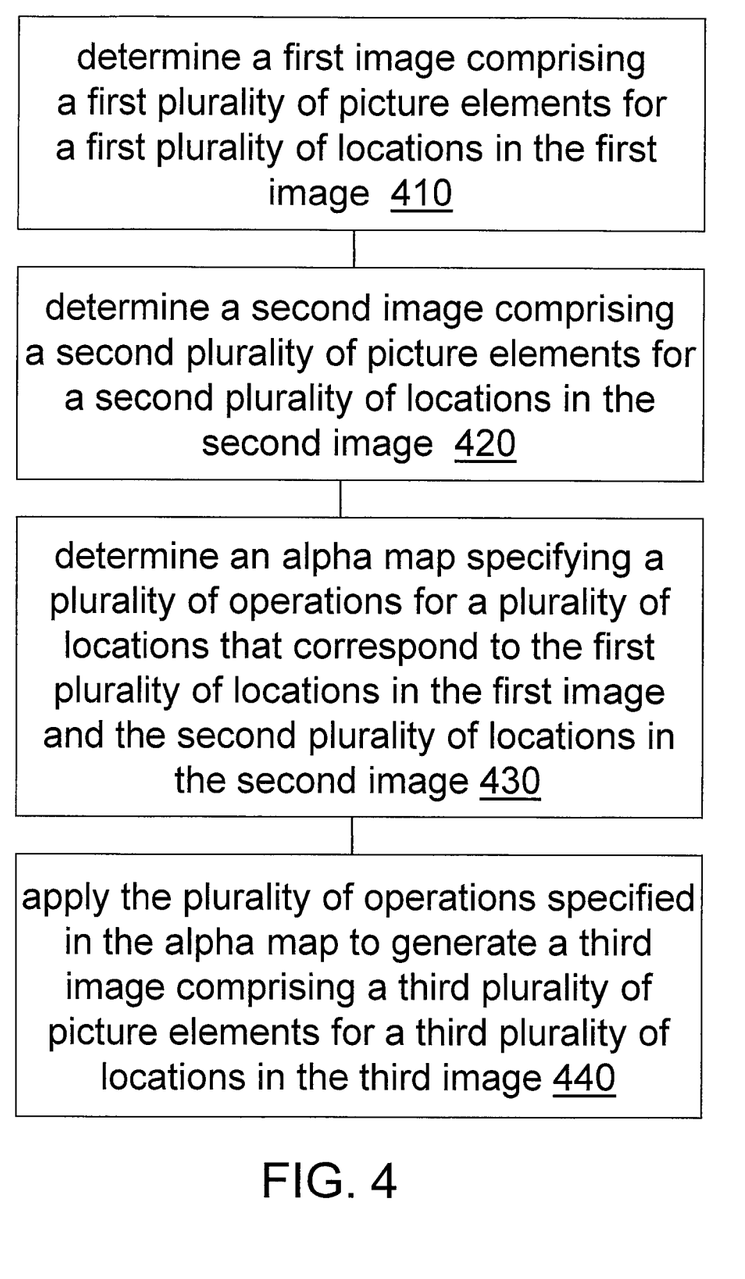
FIG. 4 illustrates an example process flow, according to a possible embodiment of the present invention.

FIG. 4 illustrates an example process flow according to a possible embodiment of the present invention. In some possible embodiments, one or more computing devices or components in a multiscalar display system (e.g., 100) may perform this process flow.

In block 410, the multiscalar display system (100) determines a first image comprising a first plurality of picture elements for a first plurality of locations in the first image. As used herein, a picture element may be, but is not limited to, a pixel, a block of pixels of any size, etc. For example, this first image may be an upsampled left-view image (e.g., 206) generated from an input video image (e.g., 258). The input video image (258) may in turn be generated from a code bitstream that carries 3D image data. A location in the first plurality of locations may be expressed as a set of coordinate values such as x and y in the Cartesian coordinates, or r and theta in the Polar coordinates, or coordinates in a different coordinate system. The location may be expressed in values that are relative to a set position of the first image (e.g., 206) such as the top-left corner or another set position.

In block 420, the multiscalar display system (100) determines a second image comprising a second plurality of picture elements for a second plurality of locations in the second image. For example, this second image may be an upsampled right-view image (e.g., 208) also generated from the input video image (258). A location in the second plurality of locations may be expressed as a set of coordinate values such as x and y in the Cartesian coordinates, or r and theta in the Polar coordinates, or coordinate values in a different coordinate system. The location may be expressed in values that are relative to a set position of the second image (e.g., 208) such as the top-left corner or another set position.

In block 430, the multiscalar display system (100) determines an alpha map (e.g., 210) specifying a plurality of operations (e.g., 252)—mapping, translating, rotating, blending, etc.—for a plurality of locations that correspond to the first plurality of locations in the first image and the second plurality of locations in the second image.

In block 440, the multiscalar display system (100) applies the plurality of operations (252) as specified in the alpha map (210) to generate a third image (e.g., the output CB image (212)) comprising a third plurality of picture elements for a third plurality of locations in the third image. A picture element in the third plurality of picture elements is generated in an operation in the plurality of operations (252) specified in the alpha map (210). The operation is for a location in the plurality of locations. The location in the plurality of locations corresponds to a first location in the first plurality of locations in the first image and a second location in the second plurality of locations in the second image.

In a possible embodiment, the operation in the plurality of operations specifies a selection of one of a first picture element for the first location in the first image and a second picture element for the second location in the second image as the picture element in the third plurality of picture elements.

In a possible embodiment, the first image is a left view image, and the second image is a right view image.

In a possible embodiment, the first plurality of locations corresponds 1 to 1 to the second plurality of locations. In a possible embodiment, the first plurality of locations corresponds 1 to 1 to a subset of the second plurality of locations. In a possible embodiment, the second plurality of locations corresponds 1 to 1 to a subset of the first plurality of locations.

In a possible embodiment, the multiscalar display system (100) may operate on more than two images in order to produce the output image. Some or all of the images to be operated on may be scaled video images generated by video scalars. For example, the multiscalar display system (100) may determine a fourth image comprising a fourth plurality of picture elements for a fourth plurality of locations in the fourth image. The multiscalar display system (100) may determine a second alpha map specifying a plurality of second operations for a plurality of second locations that correspond to the third plurality of locations in the third image and the fourth plurality of locations in the fourth image. The multiscalar display system (100) may apply the plurality of second operations specified in the second alpha map to generate a fifth image comprising a fifth plurality of picture elements for a fifth plurality of locations in the fifth image. Here, a picture element in the fifth plurality of picture elements may be generated in a second operation in the plurality of second operations. The second operation may be for a location in the plurality of second locations. The location in the plurality of second locations may correspond to a third location in the third plurality of locations in the third image and a fifth location in the fifth plurality of locations in the fifth image.

In a possible embodiment, the first image and the second image are generated from an image in a first 3D video format, while the third image is a in a second 3D video format. The first 3D video format may be, but is not limited to, one of (i) a SBS video format, (ii) a LBL video format, (iii) an OU video format, (iv) a CB video format, and (v) a FS video format. The second 3D video format may be, but is not limited to, one of (i) a SBS video format, (ii) a LBL video format, (iii) an OU video format, (iv) a CB video format, and (v) a FS video format.

In some possible embodiments, an alpha map may be a composite of two or more component alpha maps. The alpha map may be dynamically generated or be statically pre-deposited in memory in the multi-scalar display system (100). The alpha map may be one in a plurality of alpha maps that are supported by the multi-scalar display system.

In a possible embodiment, the first image may be generated from a media file stored in a physical storage accessible to the multi-scalar display system (100). The first image may also be generated from a bitstream received by the multi-scalar display system (100).

It should be noted that image sizes of video images processed by a multi-scalar display system may vary. For example, left-view and right-view video images or video image portions may be of an image size, while graphics data and on-screen-display data may be of a different image size.

In some embodiments, video scalars may be implemented in such a way as to support multiple video formats. In some other embodiments, specific video scalars may be implemented to support a specific video format; thus video scalars may be a collection of different video scalars supporting different video formats.

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
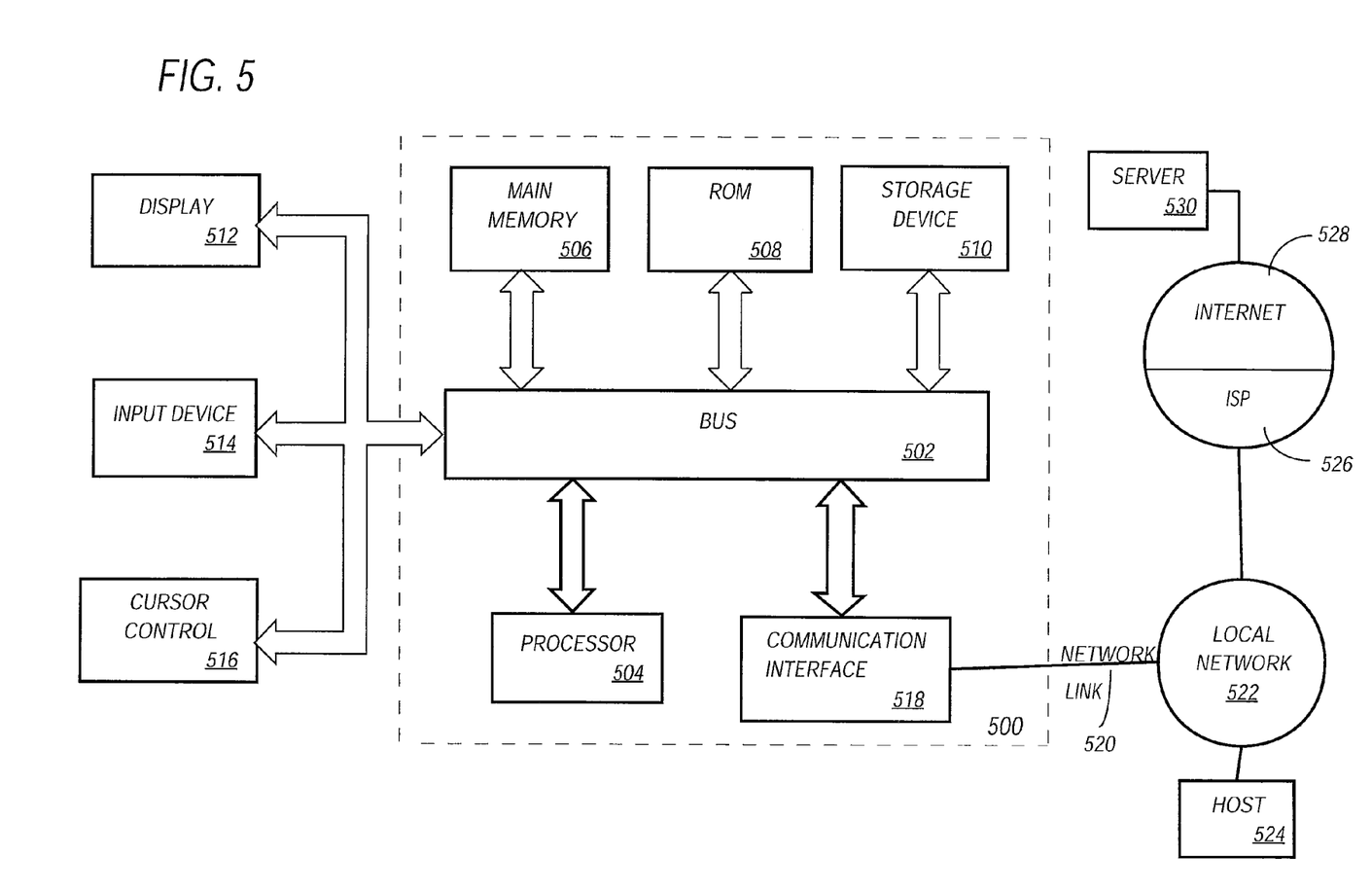
FIG. 5 illustrates an example hardware platform on which a computer or a computing device as described herein may be implemented, according a possible embodiment of the present invention.

For example, FIG. 5 is a block diagram that illustrates a computer system 500 upon which a possible embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

9. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

determining a first image comprising a first plurality of picture elements for a first plurality of locations in the first image;

determining a second image comprising a second plurality of picture elements for a second plurality of locations in the second image;

determining a first alpha map specifying a plurality of operations for a plurality of locations that correspond to the first plurality of locations in the first image and the second plurality of locations in the second image;

applying the plurality of operations specified in the first alpha map to generate a third image comprising a third plurality of picture elements for a third plurality of locations in the third image, a picture element in the third plurality of picture elements being generated in an operation in the plurality of operations, the operation being for a location in the plurality of locations, the location in the plurality of locations corresponding to a first location in the first plurality of locations in the first image and a second location in the second plurality of locations in the second image;

determining a fourth image comprising a fourth plurality of picture elements for a fourth plurality of locations in the fourth image;

determining a second alpha map specifying a plurality of second operations for a plurality of second locations that correspond to the third plurality of locations in the third image and the fourth plurality of locations in the fourth image; and applying the plurality of second operations specified in the second alpha map to generate a fifth image comprising a fifth plurality of picture elements for a fifth plurality of locations in the fifth image, wherein a picture element in the fifth plurality of picture elements is generated in a second operation in the plurality of second operations, wherein the second operation is for a location in the plurality of second locations, and wherein the location in the plurality of second locations corresponds to a third location in the third plurality of locations in the third image and a fifth location in the fifth plurality of locations in the fifth image, wherein the method is performed by one or more devices comprising a processor.

2. The method of claim 1 wherein the first alpha map is a composite of two component alpha maps.

3. The method of claim 1 wherein the first alpha map is dynamically generated by an image processing system.

4. The method of claim 1 wherein the first alpha map is pre-deposited in memory in an image processing system.

5. The method of claim 1, wherein the first alpha map is one in a plurality of alpha maps that are supported by an image processing system.

6. The method of claim 1, wherein the first image is generated from a physical storage accessible to an image processing system.

7. The method of claim 1, wherein the first image is generated from a bitstream received by an image processing system.

8. An apparatus comprising a processor and configured to perform the method recited in claim 1.

9. A non-transitory computer readable storage medium, comprising software instructions, which when executed by one or more processors cause performance of the method recited in claim 1.

* * * * *